(12) United States Patent
Lai et al.

(10) Patent No.: US 11,567,254 B2
(45) Date of Patent: Jan. 31, 2023

(54) LIGHT GUIDE DEVICE AND DISPLAY APPARATUS

(71) Applicant: Coretronic Corporation, Hsin-Chu (TW)

(72) Inventors: Yu-Sung Lai, Hsin-Chu (TW); Chun-Chi Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/372,529

(22) Filed: Jul. 12, 2021

(65) Prior Publication Data

US 2022/0043199 A1 Feb. 10, 2022

(30) Foreign Application Priority Data

Aug. 7, 2020 (CN) .......................... 202021624796.5

(51) Int. Cl.
*F21V 8/00* (2006.01)
*G02F 1/13357* (2006.01)

(52) U.S. Cl.
CPC ......... *G02B 6/0036* (2013.01); *G02B 6/0038* (2013.01); *G02F 1/133603* (2013.01)

(58) Field of Classification Search
CPC ................ G02B 6/0036; G02B 6/0038; G02F 1/133603
See application file for complete search history.

(56) References Cited

U.S. PATENT DOCUMENTS

| | | | | |
|---|---|---|---|---|
| 8,194,000 B2* | 6/2012 | Lee | ...................... | G09G 3/3611 345/1.3 |
| 10,598,985 B1* | 3/2020 | Chen | .................. | G02F 1/136277 |
| 2002/0080596 A1* | 6/2002 | Fukiharu | .............. | G02B 6/0038 362/601 |
| 2009/0135623 A1* | 5/2009 | Kunimochi | .......... | G02B 6/0016 362/608 |
| 2012/0106195 A1* | 5/2012 | Chen | .................... | G02B 6/0076 362/613 |
| 2013/0286679 A1* | 10/2013 | Chen | .................... | G02B 6/0053 362/607 |
| 2014/0146561 A1* | 5/2014 | Yuki | .................... | G02B 6/0033 362/606 |
| 2021/0294018 A1* | 9/2021 | Kanbayashi | ............ | G06F 3/011 |

FOREIGN PATENT DOCUMENTS

| CN | 106352271 | 1/2017 |
|---|---|---|
| TW | 200841061 | 10/2008 |
| TW | I560479 | 12/2016 |

* cited by examiner

*Primary Examiner* — Fatima N Farokhrooz
(74) *Attorney, Agent, or Firm* — JCIPRNET (57) ABSTRACT

A light guide device having a first surface and a second surface opposite to each other is provided. The first surface includes a plurality of light guide microstructures arranged in a first direction. Cross sections of at least one part of the light guide microstructures in the first direction are non-isosceles triangles. Herein, a distribution position of the light guide microstructures whose cross sections are non-isosceles triangles are symmetrical to a central axis of the light guide device in the first direction, and a maximum base angle of the cross section of each of the light guide microstructures is away from the central axis. A display apparatus including the light guide device is also provided. Through the light guide device and the display apparatus provided by the disclosure, light emission intensity of the display apparatus at a large viewing angle is improved.

9 Claims, 13 Drawing Sheets

LIGHT GUIDE DEVICE AND DISPLAY APPARATUS

CROSS-REFERENCE TO RELATED APPLICATION

This application claims the priority benefit of China application serial no. 202021624796.5, filed on Aug. 7, 2020. The entirety of the above-mentioned patent application is hereby incorporated by reference herein and made a part of this specification.

BACKGROUND

Technical Field

The disclosure relates to an optical device and an electronic apparatus, and in particular, relates to a light guide device and a display apparatus.

Description of Related Art

At present, in the development of displays, the development trend of the backlight modules mainly focuses on thin appearances and high light efficiency. In order to meet the requirements of lightness, thinness, and high light efficiency, most of the backlight modules are made based on the side incident structure and the light-emitting diodes. In such a structure, a highly collimated light guide plate and an inverse prism structure arranged thereon are provided. Nevertheless, the viewing angle provided by an existing structure is excessively small, so such a structure is not suitable for multi-user viewing. In order to meet the requirements of high light efficiency and multi-user viewing, how to increase the horizontal viewing angle is an important issue in this field.

The information disclosed in this BACKGROUND section is only for enhancement of understanding of the background of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY

The disclosure provides a light guide device and a display apparatus capable of providing improved emission intensity of the display apparatus at a large viewing angle and an increased horizontal viewing angle of the display apparatus, such that multiple users may view a display image at the same time, and a favorable viewing effect is also provided.

Other objects and advantages of the disclosure may be further illustrated by the technical features broadly embodied and described as follows.

In order to achieve one or a portion of or all of the objects or other objects, the disclosure provides a light guide device having a first surface and a second surface opposite to each other. The first surface includes a plurality of light guide microstructures arranged in a first direction, and cross sections of at least one part of the light guide microstructures in the first direction are non-isosceles triangles. Herein, a distribution position of the light guide microstructures whose cross sections are non-isosceles triangles is symmetrical to a central axis of the light guide device in the first direction, and a maximum base angle of the cross section of each of the light guide microstructure is away from the central axis.

In order to achieve one or a portion of or all of the objects or other objects, the disclosure provides a display apparatus including a backlight module and a display module. The backlight module is configured to provide an illumination beam. The backlight module includes a light-emitting device and a light guide device. The light-emitting device provides a light beam towards the light guide device. The light guide device receives the light beam to form the illumination beam. The light guide device has a first surface and a second surface opposite to each other. The first surface includes a plurality of light guide microstructures arranged in a first direction, and cross sections of at least one part of the light guide microstructures in the first direction are non-isosceles triangles. Herein, a distribution position of the light guide microstructures whose cross sections are non-isosceles triangles is symmetrical to a central axis of the light guide device in the first direction, and a maximum base angle of the cross section of each of the light guide microstructure is away from the central axis. The display module is disposed in a transmission path of the illumination beam and is configured to receive the illumination beam to form a display image.

To sum up, in the light guide device and the display apparatus provided by the disclosure, the light output surfaces of the light guide device include the light guide microstructures arranged in the horizontal viewing angle direction. The cross sections of the light guide microstructures in the horizontal viewing angle direction are non-isosceles triangles. The distribution position of the light guide microstructures is symmetrical to the central axis of the light guide device in the horizontal viewing angle direction, and the maximum base angle of the cross section of each of the light guide microstructures is away from the central axis. In this way, light emission intensity of the display apparatus at a large viewing angle may be improved, the horizontal viewing angle of the display apparatus may be further increased, such that multiple users may view a display image at the same time, and a favorable viewing effect is also provided.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled, and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
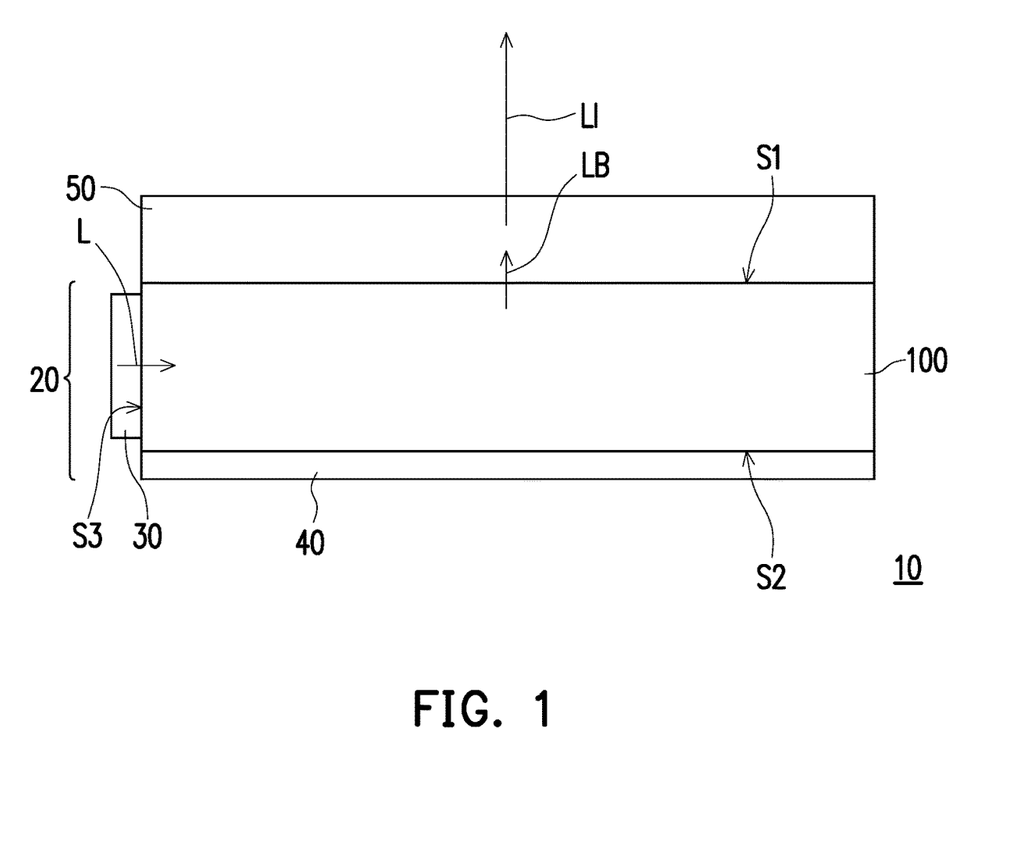
FIG. 1 is a schematic view of a display apparatus according to an embodiment of the disclosure.

FIG. 1 is a schematic view of a display apparatus according to an embodiment of the disclosure. With reference to FIG. 1, a display apparatus 10 provided by the embodiment is configured to provide a display image LI. The display apparatus 10 includes a backlight module 20 and a display module 50. The backlight module 20 is configured to provide an illumination beam LB. The display module 50 is disposed in a transmission path of the illumination beam LB and is configured to receive the illumination beam LB to form the display image LI. For instance, the display module 50 is, for example, a liquid crystal display panel or other non-self illuminating display panels, and the display apparatus 10 is, for example, a television, a computer, a tablet computer, or a mobile phone.

The backlight module 20 includes a light-emitting device 30 and a light guide device 100. The light guide device 100 has a first surface S1 and a second surface S2 opposite to each other and a light incident surface S3 connected to the first surface S1 and the second surface S2. To be specific, the backlight module 20 is an edge type backlight module, and the first surface S1 faces the display module 50, which should however not be construed as limitations to the disclosure. In other embodiments, the second surface S2 may face the display module 50. The light-emitting device 30 is disposed at one side of the light guide device 100 where the light incident surface S3 is located and is configured to provide a light beam L towards the light guide device 100, such that the light guide device 100 receives the light beam L to form the illumination beam LB. The light-emitting device 30 is, for example, a plurality of light-emitting diodes or light-emitting diode light bars, and the light guide device 100 is, for example a light guide plate. To be more specific, the backlight module 20 may selectively include a reflective member 40 disposed on the second surface S2 of the light guide device 100 and configured to reflect the light beam L, so that the light beam L is transmitted towards the display module 50.

Figure 2:
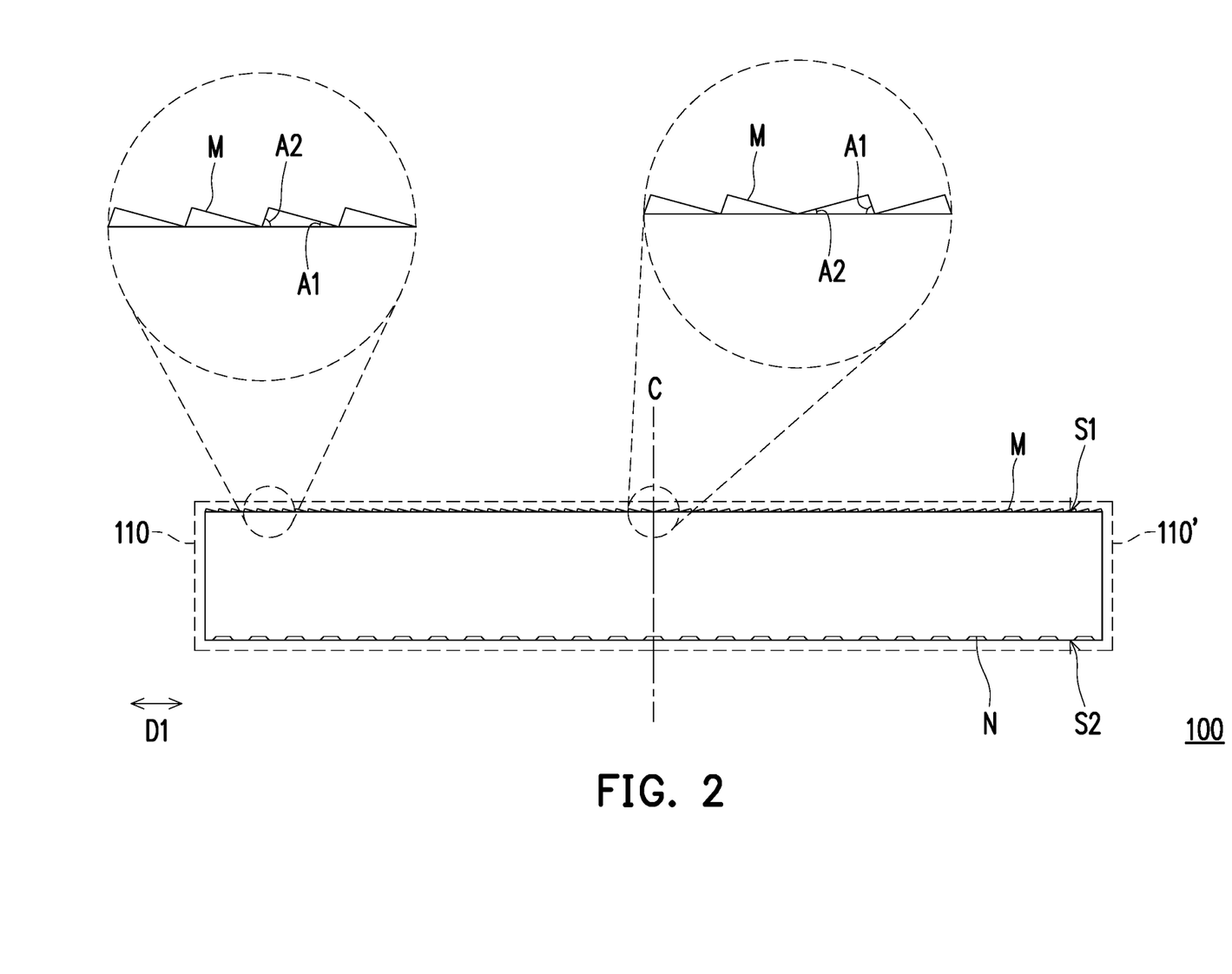
FIG. 2 is a cross-sectional schematic view of a light guide device according to an embodiment of the disclosure.
Figure 3:
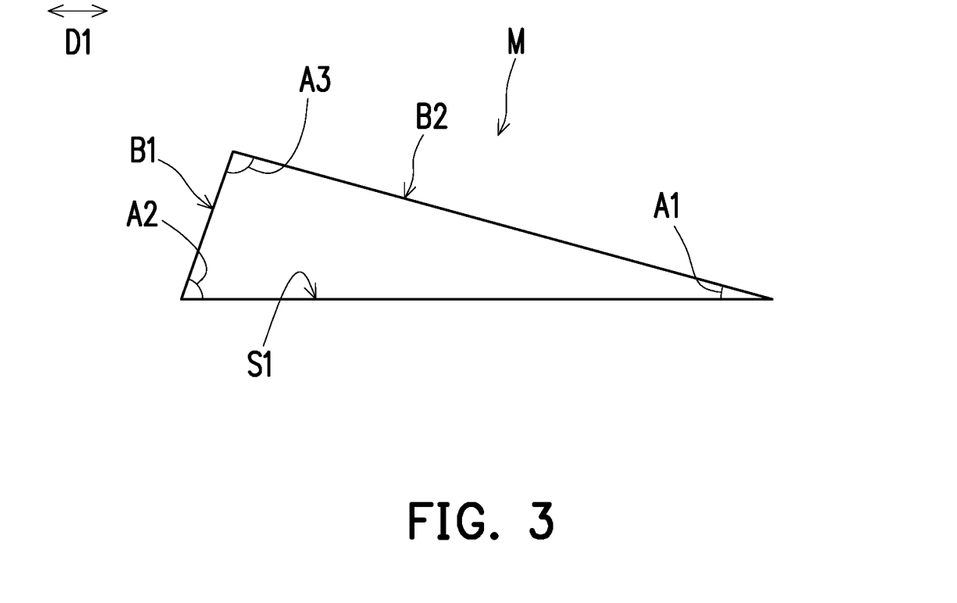
FIG. 3 is a schematic view of a cross-section of a single light guide microstructure in FIG. 2.

FIG. 2 is a cross-sectional schematic view of a light guide device according to an embodiment of the disclosure. FIG. 3 is a schematic view of a cross-section of a single light guide microstructure in FIG. 2. With reference to FIG. 1 to FIG. 3, To be specific, the first surface S1 includes a plurality of light guide microstructures M arranged in a first direction D1 (each of the light guide microstructures M may selectively extend in a direction perpendicular to the first direction D1). The second surface S2 includes a plurality of bottom side light guide microstructures N, the bottom side light guide microstructures N extend in the first direction D1, and the first direction D1 is parallel to the light incident surface S3. To be specific, the first direction D1 is parallel to the light incident surface S3 and the first surface S1, which should however not be construed as limitations to the disclosure. In other embodiments, the light guide microstructures M may be disposed on the second surface S2, and the first surface S1 may selectively include or exclude the bottom side light guide microstructures N. Further, the light beam L from the light-emitting device 30 is transmitted in the light guide device 100 and is outputted through reflection and refraction of two light output surfaces B1 and B2 of the light-guiding microstructures M to form the illumination beam LB. In this embodiment, the light guide microstructures M located on the first surface S1 are, for example, asymmetric prism structures. For instance, a cross section (as shown in FIG. 3) of each of the light guide microstructures M in the first direction D1 is a non-isosceles triangle. This non-isosceles triangle may define two base angles A1 and A2 and one vertex angle A3, where an included angle between the light output surface B1 and the first surface S1 is the base angle A2, an included angle between the light output surface B2 and the first surface S1 is the base angle A1, and the two base angles A1 and A2 may be regarded as a maximum base angle and a minimum base angle respectively according angles thereof. To be specific, the minimum base angle of the cross section of the light guide microstructure M is less than 10 degrees, and the vertex angle A3 of the light guide microstructure M is between 80 degrees and 120 degrees. In other words, as the light guide microstructures M may be disposed at different positions on the light guide device 100, an angle ratio of the base angle A1 to the base angle A2 may change. In this way, a traveling direction of the light beam L after being outputted from the two light output surfaces B1 and B2 may be adjusted, and that a light distribution of the illumination beam LB may be determined. The bottom side light guide microstructures N located on the second surface S2 are, for example, curved surfaces recessed on the second surface S2 towards the first surface S1, conical surfaces, or other geometrical structures and have reflective surfaces (not shown) facing the light incident surface S3 and configured to reflect the light beam L transmitted in the light guide device 100 to be transmitted towards the first surface S1. Herein, an included angle between the reflective surface of each of the bottom side light guide microstructures N and the second surface S2 is, for example, 2 degrees, which should however not be construed as limitations to the disclosure. Note that the bottom side light guide microstructures N shown in FIG. 2 are regularly arranged, but in other embodiments, the bottom side light guide microstructures N many be randomly arranged.

Figure 4:
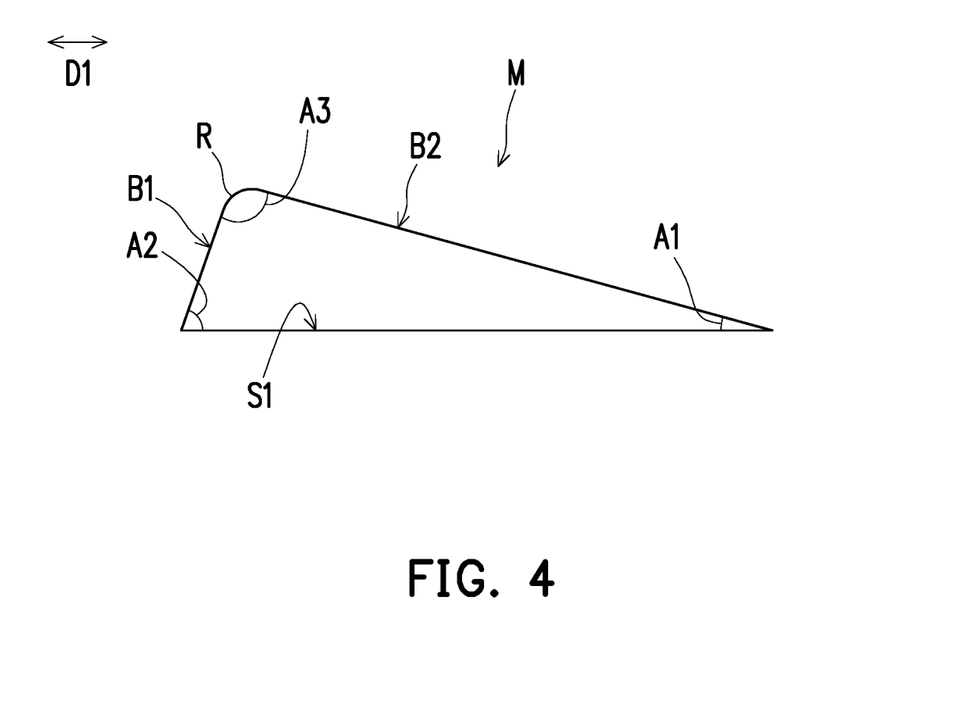
FIG. 4 is a cross-sectional view of the light guide microstructure according to another embodiment of the disclosure.

FIG. 4 is a cross-sectional view of the light guide microstructure according to another embodiment of the disclosure. With reference to FIG. 4, in the embodiment, the vertex angle A3 of the cross section of the light guide microstructure M has a radius of curvature. That is, the vertex angle A3 has a chamfer structure R. In this way, light intensity at a small angle in a viewing angle may be uniformized, and that the light distribution of the illumination beam is further optimized. Note that since the vertex angle A3 has the chamfer structure R, an angle of the vertex angle A3 may be defined as an included angle between the light output surface B1 and the light output surface B2 or an angle of 180 degrees minus the two base angles A1 and A2.

With reference to FIG. 1 to FIG. 3, a distribution position of the light guide microstructures M whose cross sections are non-isosceles triangles is symmetrical to (or mirror symmetrical to) a central axis C of the light guide device 100 in the first direction D1, and a maximum base angle of the cross section of each of the light guide microstructures M is away from the central axis C. Further, as shown in FIG. 2, the first surface S1 of the light guide device 100 includes a gradient region 110 and a gradient region 110' arranged in the first direction D1, and the light guide microstructures M are disposed in the gradient region 110 and the gradient region 110'. The maximum base angle of each of the light guide microstructures M disposed in the gradient region 110 at the left side of the central axis C is the base angle A2 at the left side of the non-isosceles triangle. The maximum base angle of each of the light guide microstructures M disposed in the gradient region 110' at the right side of the central axis C is the base angle A1 at the right side of the non-isosceles triangle. To be specific, FIG. 3 shows one of the light guide microstructures M disposed in the gradient region 110. In this embodiment, all of the cross sections of these light guide microstructures M in each of the gradient regions 110 and 110' are non-isosceles triangles, the maximum base angles of the cross sections of these light guide microstructures M have the same angle and are away from the central axis C. Therefore, a portion of the illumination beam LB in a left side region of the light guide device 100 may be guided to a large viewing angle region at the right side, and a portion of the illumination beam LB in a right side region of the light guide device 100 may be guided to a large viewing angle at the left side. In this way, light emission intensity of the display apparatus at a large viewing angle may be improved, a horizontal viewing angle of the display apparatus may be further increased, such that multiple users may view a display image at the same time, and a favorable viewing effect is also provided. In different embodiments, different numbers of the light guide microstructures may be designed according to needs, which should however not be construed as limitations to the disclosure. Note that the central axis C may be disposed at a central position of the light guide device in the first direction in this embodiment, but the central axis C may not have to be disposed at the central position of the light guide device in the first direction in other embodiments. That is, areas of the left side region and the right side region of the central axis C may be different.

Figure 5:
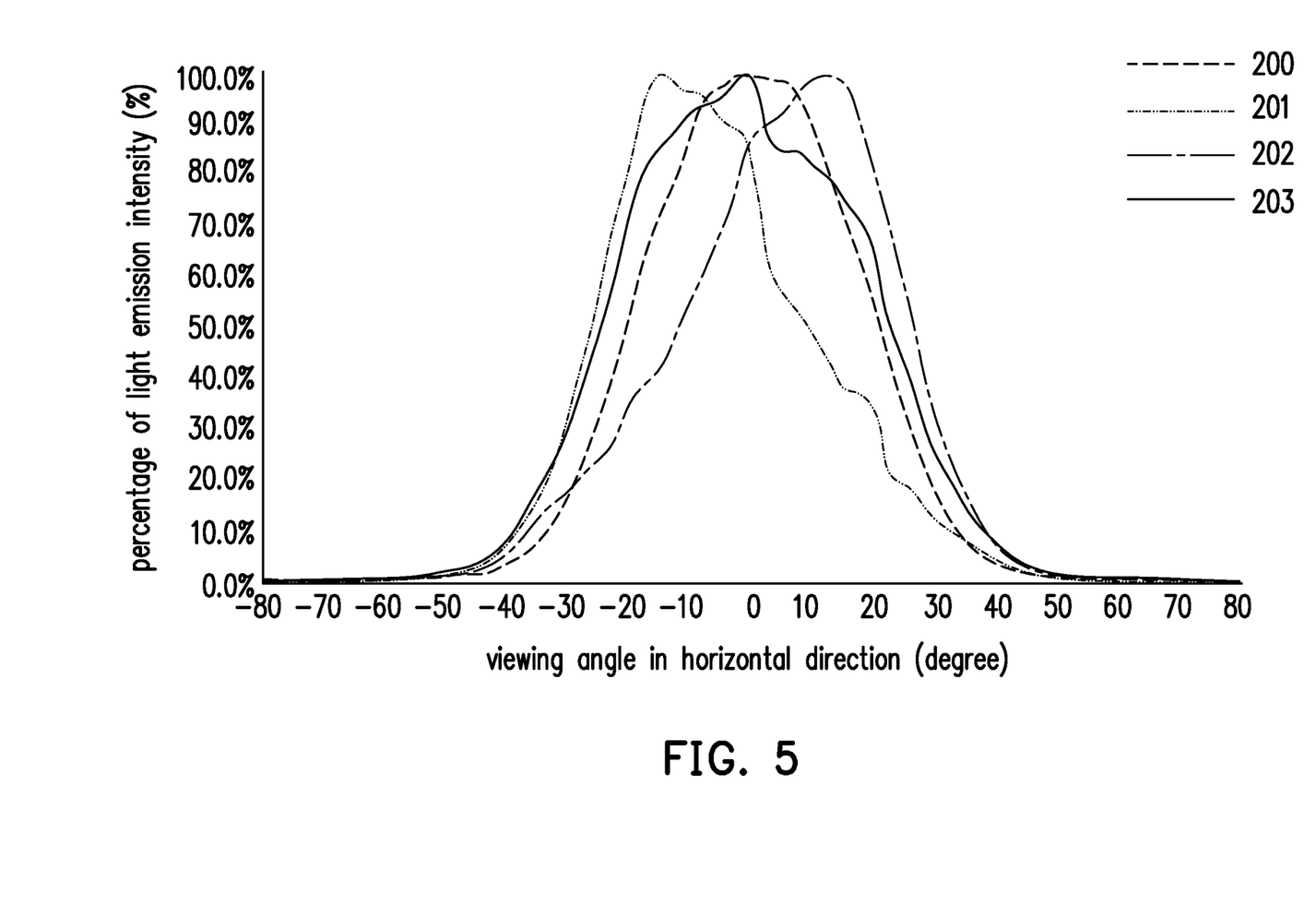
FIG. 5 is a graph of distributions of light emission intensity of the display apparatus using a conventional light guide device and the light guide device in FIG. 2 at a horizontal viewing angle.

FIG. 5 is a graph of distributions of light emission intensity of the display apparatus using a conventional light guide device and the light guide device in FIG. 2 at a horizontal viewing angle. With reference to FIG. 2 and FIG. 5, in FIG. 5, the abscissa is a viewing angle (angle off axis) of the display apparatus in a horizontal direction (unit: degree), and the ordinate is a percentage of light emission intensity of the display apparatus. Herein, a curve 200 represents a distribution of light emission intensity of a conventional display apparatus at the horizontal viewing angle. If light emission intensity that reaches half of maximum light emission intensity is defined as the horizontal viewing angle of the display apparatus, it can be seen from FIG. 2 that the horizontal viewing angle of the conventional display apparatus is approximately 40 degrees. Curves 201 and 202 respectively represent distributions of light emission intensity of the left and right side regions of the display apparatus 10 provided by this embodiment at the horizontal viewing angle, and a curve 203 is an equivalent distribution curve obtained by combining the curves 201 and 202. From the definition of the horizontal viewing angle, it can be seen that the horizontal viewing angle (the curve 203) of the display apparatus 10 provided by this embodiment is approximately 48 degrees. It thus can be seen that in the display apparatus 10 using the light guide device 100 provided by this embodiment, the light emission intensity of the display apparatus 10 at a large viewing angle may be improved, the horizontal viewing angle of the display apparatus 10 may be further increased, such that multiple users may view a display image at the same time, and a favorable viewing effect is also provided.

Figure 6A:
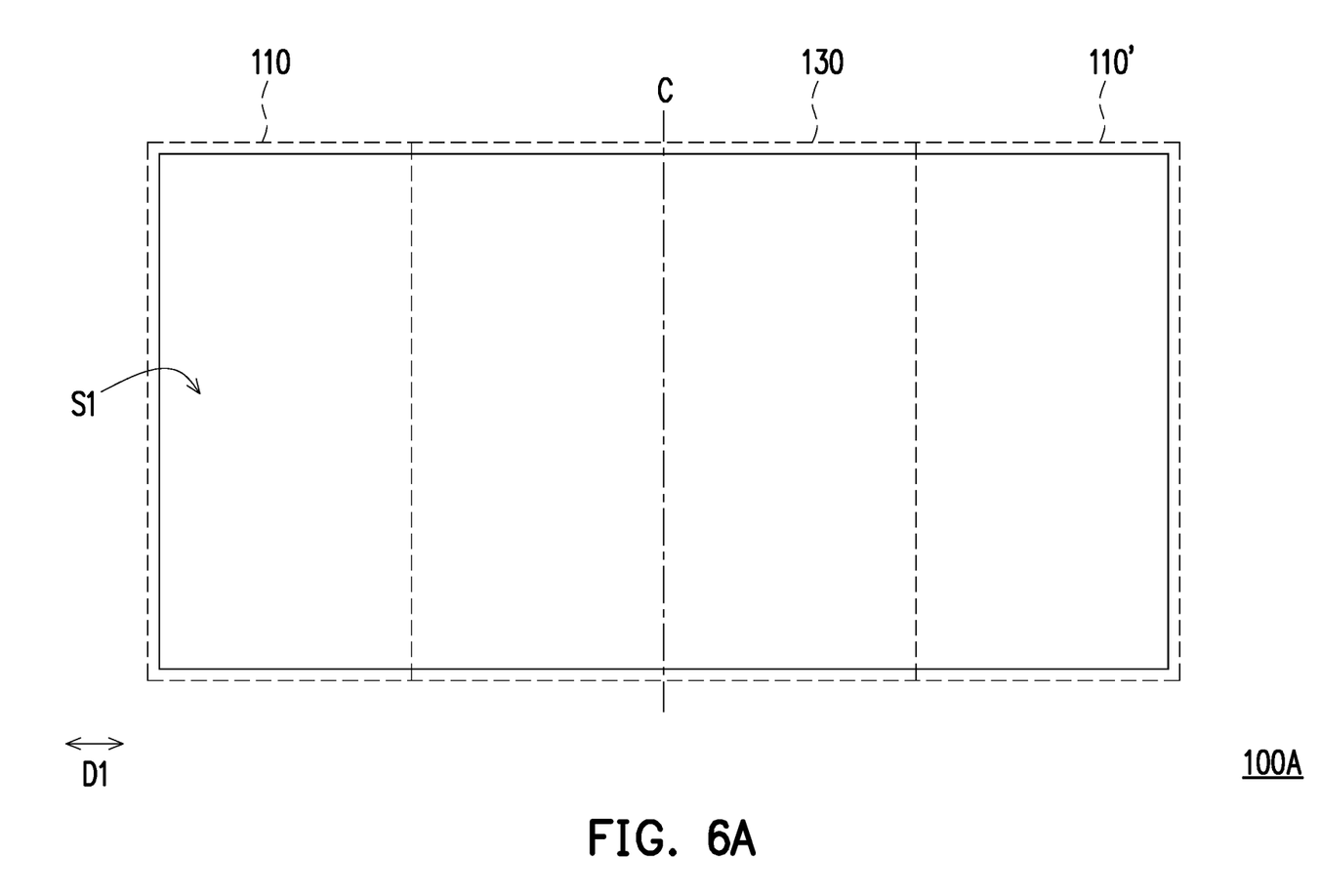
FIG. 6A and FIG. 6B respectively are a top schematic view and a cross-sectional schematic view of a light guide device according to another embodiment of the disclosure.
Figure 6B:
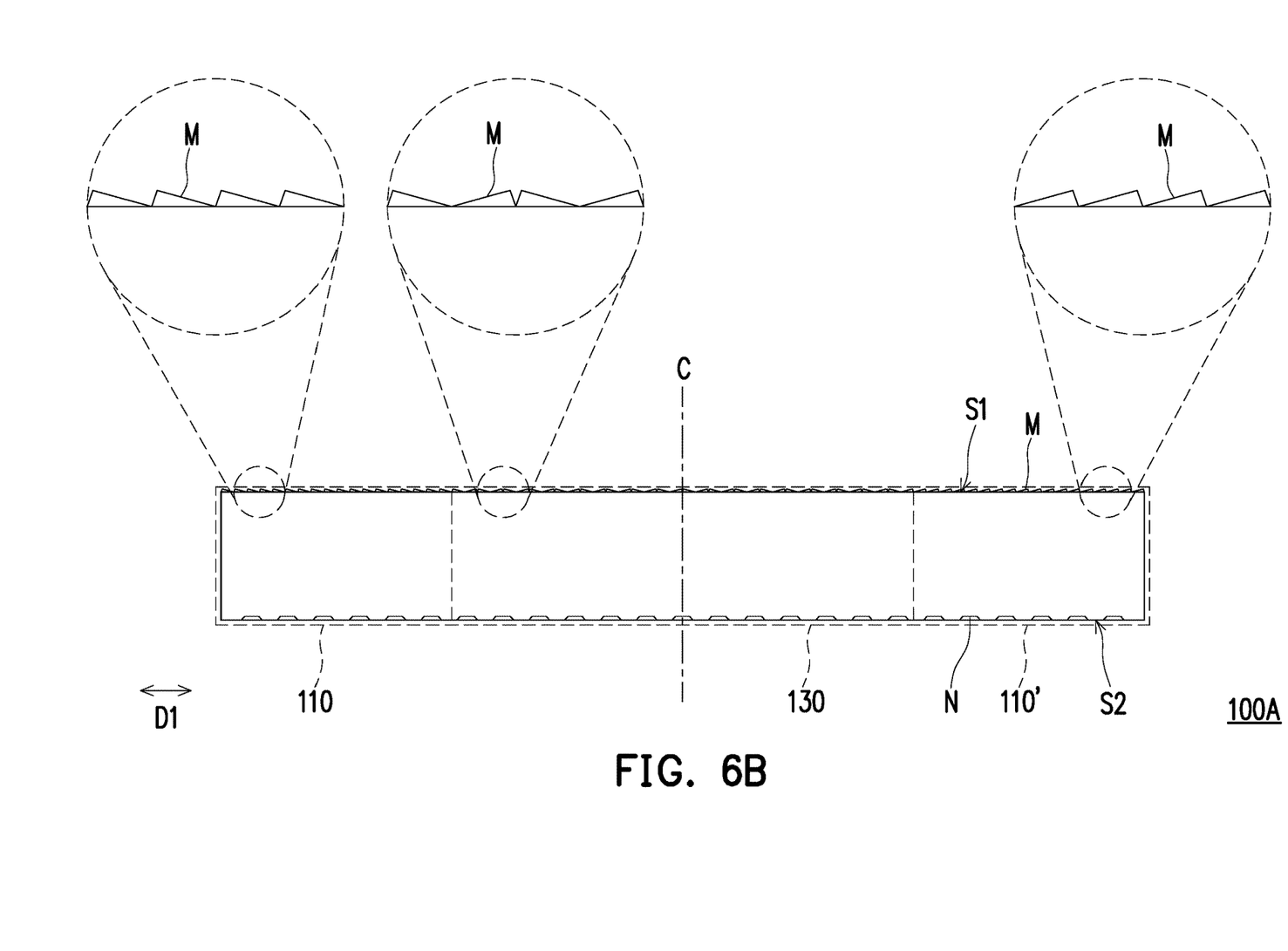

FIG. 6A and FIG. 6B respectively are a top schematic view and a cross-sectional schematic view of a light guide device according to another embodiment of the disclosure. With reference to FIG. 6A and FIG. 6B, a light guide device 100A provided by this embodiment is similar to the light guide device 100 shown in FIG. 2. A difference therebetween is that the first surface S1 of the light guide device 100A includes the gradient regions 110 and 110' and a mixed region 130 arranged in the first direction D1 in the embodiment. For instance, in the embodiment, the first surface S1 of the light guide device 100 is provided with the gradient regions 110 and 110' and the mixed region 130 located between the two gradient regions. The light guide microstructures M are disposed in the gradient region 110, the gradient region 110', and the mixed region 130. Herein, angles of the maximum base angles of the cross sections of the light guide microstructures M in the gradient region 110, the gradient region 110', and the mixed region 130 are identical. Further, the maximum base angles of the cross sections of the light guide microstructures M in the gradient region 110 and the gradient region 110' are away from the central axis C. For instance, the maximum base angles of the light guide microstructures M disposed in the gradient region 110 are the base angles located at the left side of the non-isosceles triangles. The maximum base angles of the light guide microstructures M disposed in the gradient region 110' are the base angles located at the right side of the non-isosceles triangles, as shown in FIG. 6B. Further, cross sections of one part of the light guide microstructures M among the light guide microstructures M located in the mixed region 130 are identical to that of the light guide microstructures M located in the gradient region 110. Cross sections of another part of the light guide microstructures M among the light guide microstructures M located in the mixed region 130 are identical to that of the light guide microstructures M located in the gradient region 110', and these two part of the light guide microstructures M are arranged in an alternating manner, as shown in FIG. 6B. In this way, the horizontal viewing angle of the display apparatus using the light guide device 100A is increased, and that display quality of the display image to be viewed by multiple users is further improved. In different embodiments, different numbers of the gradient regions disposed at two sides of the mixed region 130 may be designed according to needs, which should however not be construed as limitations to the disclosure.

Figure 7A:
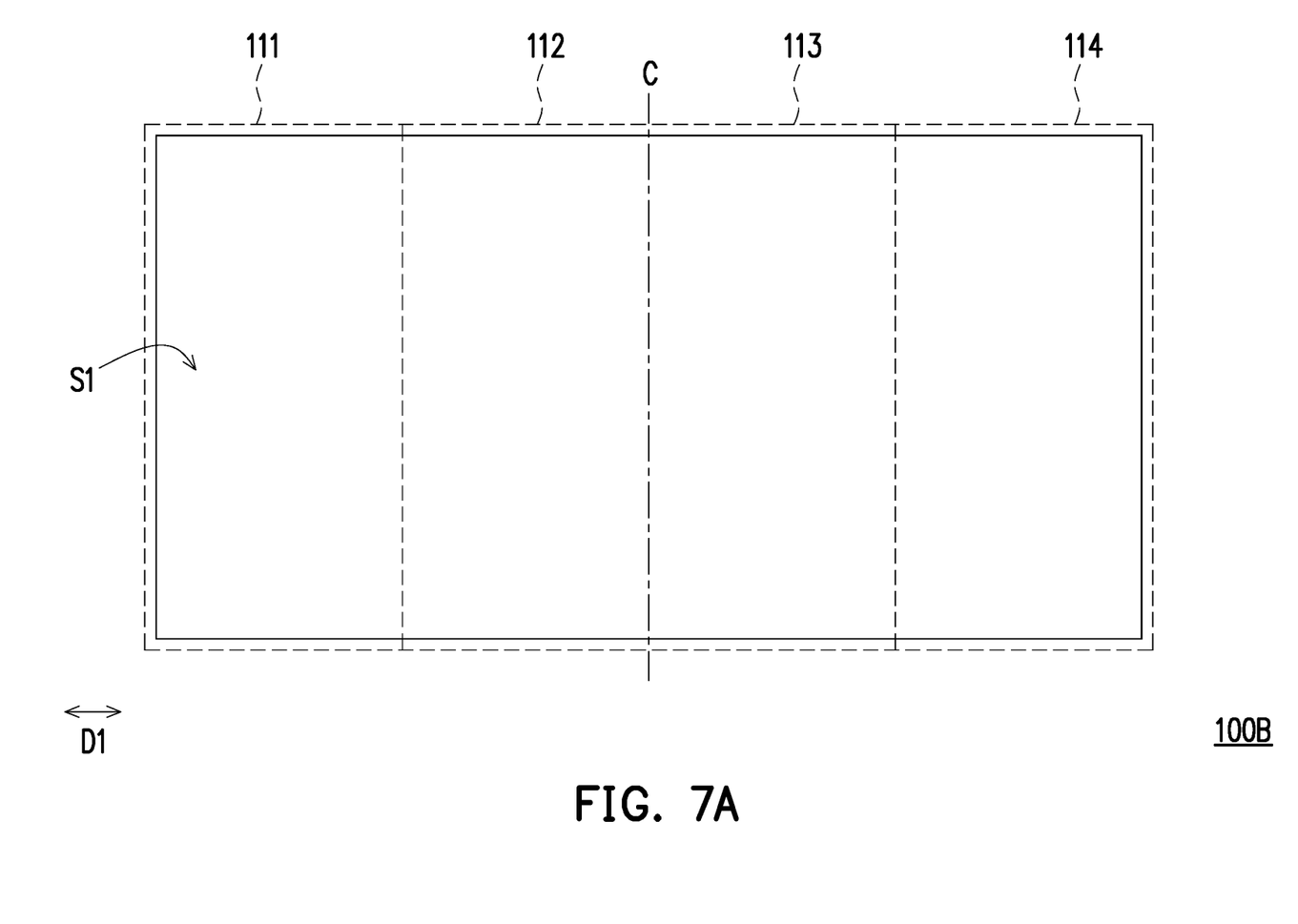
FIG. 7A and FIG. 7B respectively are a top schematic view and a cross-sectional schematic view of a light guide device according to another embodiment of the disclosure.
Figure 7B:
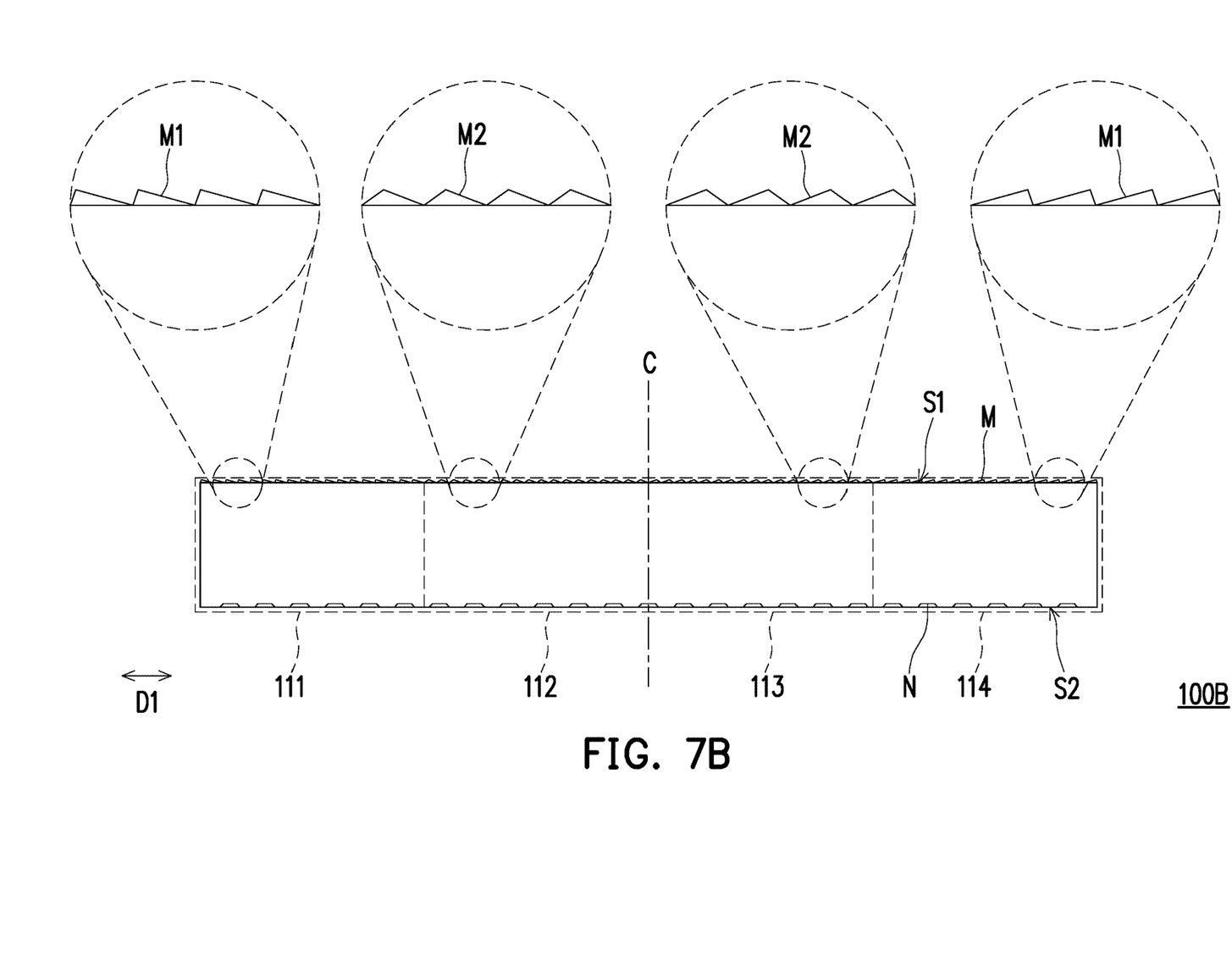

FIG. 7A and FIG. 7B respectively are a top schematic view and a cross-sectional schematic view of a light guide device according to another embodiment of the disclosure. With reference to FIG. 7A and FIG. 7B, a light guide device 100B provided by this embodiment is similar to the light guide device 100 shown in FIG. 2. A difference therebetween is that the first surface S1 of the light guide device 100B includes a plurality of gradient regions 111, 112, 113, and 114 arranged in the first direction D1. The light guide microstructures M are disposed in the gradient regions 111, 112, 113, and 114, and each of the gradient regions 111, 112, 113, and 114 includes plural light guide microstructures M. Angles of the maximum base angles of the cross sections of the light guide microstructures M in each of the gradient regions 111, 112, 113, and 114 are identical. Further, the angles of the maximum base angles of the cross sections of the light guide microstructures M increase (or angles of the minimum base angles decrease) when a distance between each of the gradient regions 111, 112, 113, and 114 (central position of the gradient region in the first direction, for example) and the central axis C increases. That is, the distribution position and structures of the light guide microstructures M are symmetrical to (or mirror symmetrical to) the central axis C of the light guide device 100 in the first direction D1. For instance, the light guide device 100B provided by this embodiment has four gradient regions 111, 112, 113, and 114, and the light guide microstructures M include light guide microstructures M1 disposed in the gradient regions 111 and 114 and light guide microstructures M2 disposed in the gradient regions 112 and 113. Herein, maximum base angles of cross sections of the light guide microstructures M1 located in the outer gradient regions 111 and 114 are greater than maximum base angles of cross sections of the light guide microstructures M2 located in the inner gradient regions 112 and 113, as shown in FIG. 7B. In this way, the horizontal viewing angle of the display apparatus using the light guide device 100B is increased, and that display quality of the display image to be viewed by multiple users is further improved, which should however not be construed as limitations to the disclosure. In different embodiments, different numbers of the gradient regions and the number of the light guide microstructures included in each of the gradient regions may be designed according to needs. For instance, the number of the gradient regions may be four and may be an even number, and the number of the light guide microstructures in each of the gradient regions may be one, for example. In another different embodiment, the central axis C may not have to be disposed at the central position of the light guide device in the first direction. That is, the numbers of the gradient regions at the left side region and the right side region of the central axis C may be different.

Figure 8A:
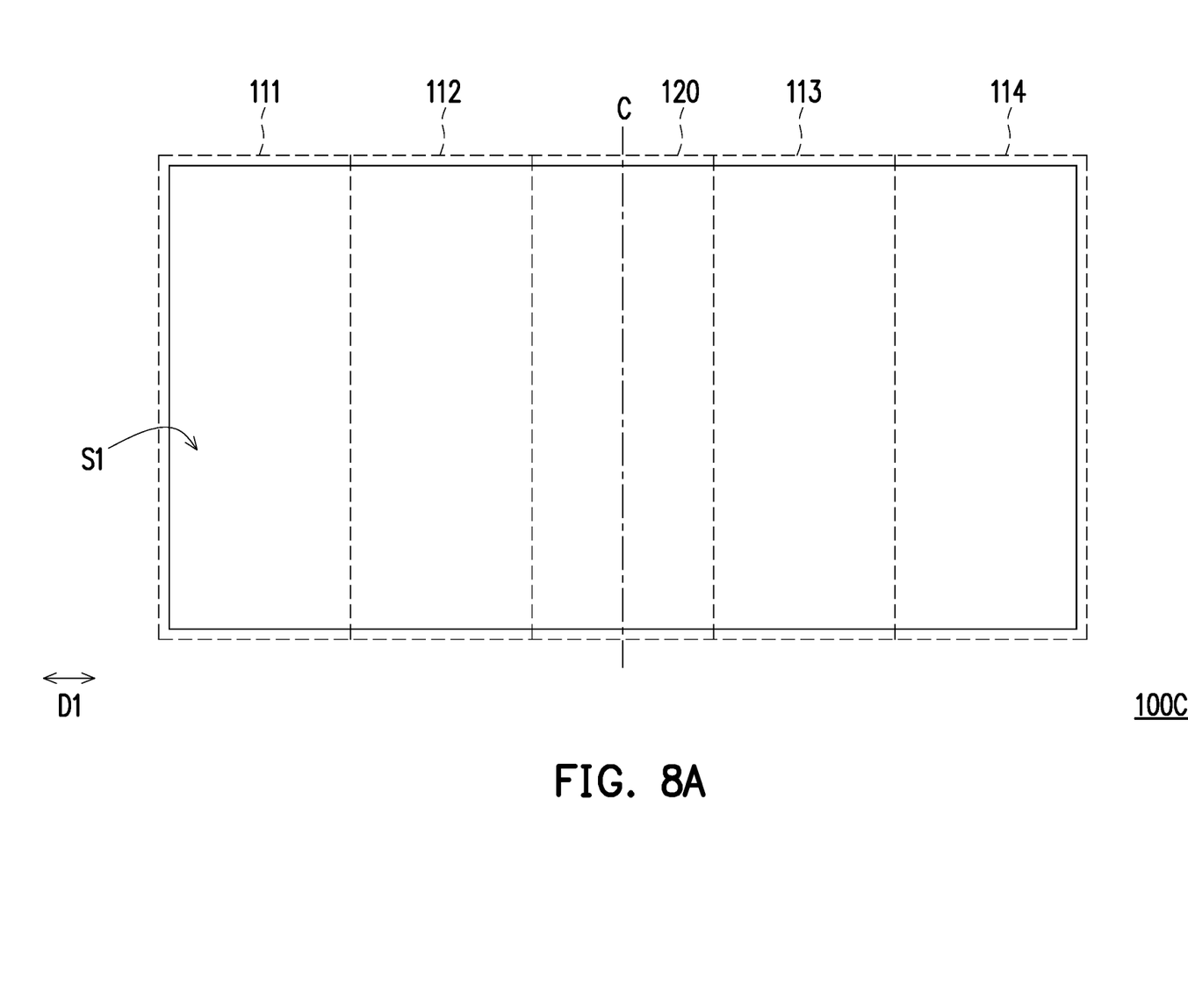
FIG. 8A and FIG. 8B respectively are a top schematic view and a cross-sectional schematic view of a light guide device according to another embodiment of the disclosure.
Figure 8B:
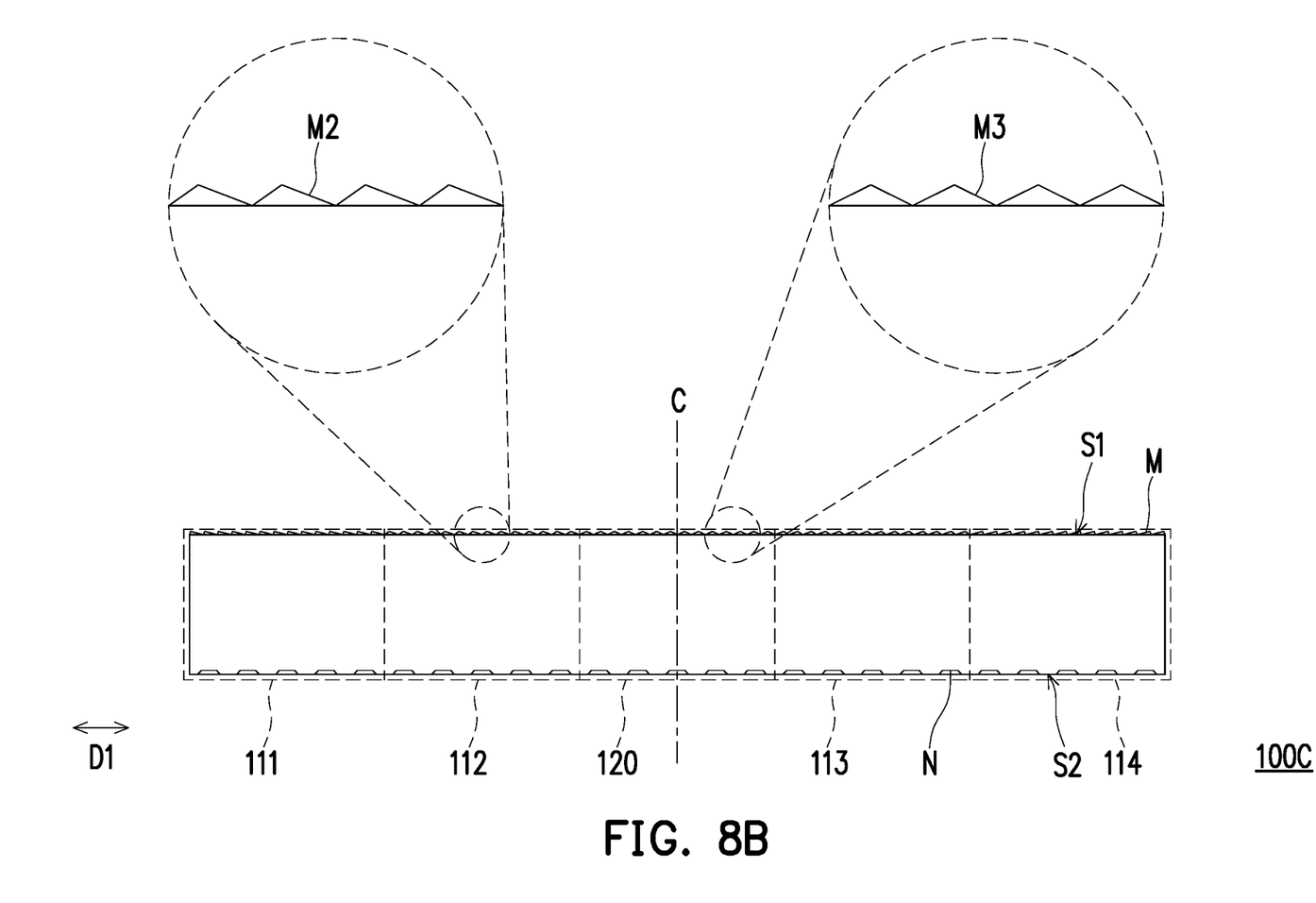

FIG. 8A and FIG. 8B respectively are a top schematic view and a cross-sectional schematic view of a light guide device according to another embodiment of the disclosure. With reference to FIG. 8A and FIG. 8B, a light guide device 100C provided by this embodiment is similar to the light guide device 100B shown in FIG. 7B. A difference therebetween is that the first surface S1 in this embodiment further includes a non-gradient region 120 located between the gradient regions 111, 112, 113, and 114. For instance, the non-gradient region 120 is located between the gradient region 112 and the gradient region 113. The central axis C of the light guide device 100 is located in the non-gradient region 120. The light guide microstructures M further include light guide microstructures M3 disposed in the non-gradient region 120. Cross sections of the light guide microstructures M3 located in the non-gradient region 120 are isosceles triangles, as shown in FIG. 8B. In other words, the first surface S1 of the light guide device 100C provided by this embodiment may be divided into regions of an odd number including gradient regions of an even number and one non-gradient region. In this way, luminance of a small viewing angle (e.g., a front viewing angle) may be increased, and a favorable horizontal viewing angle is provided. Note that in different embodiments, the number and the width of the non-gradient region may be changed and designed according to needs, and the disclosure is not limited to the illustration shown in FIG. 8A and FIG. 8B.

Figure 8C:
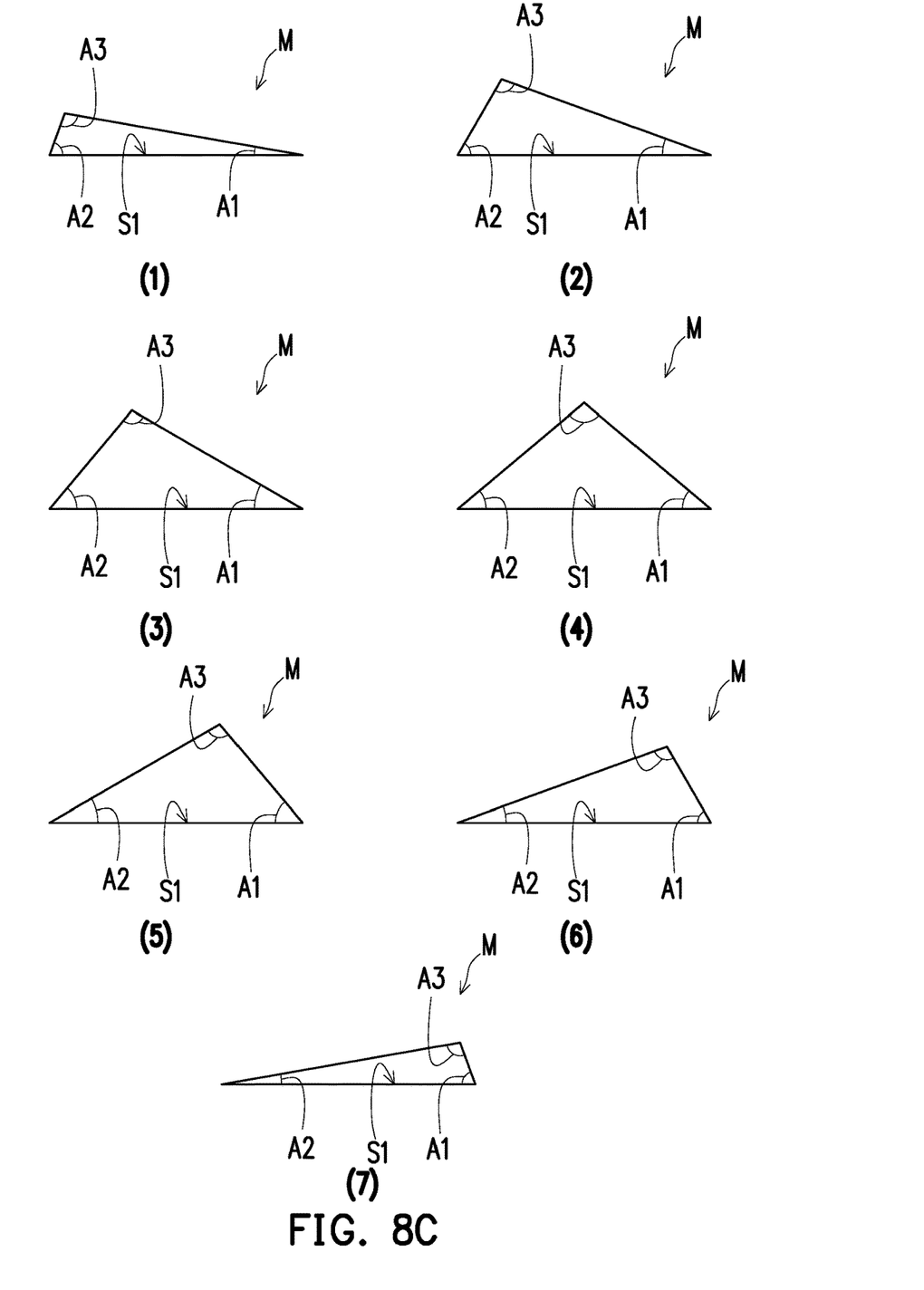
FIG. 8C is schematic views of a series of cross sections of different light guide microstructures in the light guide device according to another embodiment of the disclosure.

FIG. 8C is schematic views of a series of cross sections of different light guide microstructures in the light guide device according to another embodiment of the disclosure. With reference to FIG. 8A to FIG. 8C together, in a preferred embodiment, the light guide device 100C shown in FIG. 8A and FIG. 8B may be further changed. The number of the gradient regions as well as the number of the light guide microstructures M and specifications thereof disposed in the gradient regions may be increased. For instance, in this embodiment, the light guide microstructures M may be designed to provide 15 different types of specifications and are distributed in 14 different gradient regions and 1 non-gradient region. The non-gradient region is disposed in a region where the central axis C passes, the cross sections of the light guide microstructures M located in the non-gradient region are isosceles triangles, and the light guide microstructures M in each of the gradient regions are identical. The base angles A2 (and/or the base angle A1) of the light guide microstructures M in two adjacent gradient regions differ by, for example, 5 degrees (the vertex angles A3 are fixed angles, for example), as shown in the Table One below. To simplify illustration, only 7 different specifications of the light guide microstructures M are shown in FIG. 8C. To be specific, (1) to (7) in FIG. 8C show the light guide microstructure M with the left side base angles A2 being 70 degrees, 60 degrees, 50 degrees, 40 degrees, 30 degrees, 20 degrees, and 10 degrees. In this way, through the design of these progressively changing base angles, the display effect at a large viewing angle may be further improved, the display image may not be easily subjected to display distortion as affected by angle changes, and that display quality of the display image when being viewed by multiple users is thereby further improved, which should however not be construed as limitations to the disclosure. In another embodiment, according to different angles of the base angles A2, the radii of curvature and depths (heights of the vertex angles A1 to the first surface S1) of chamfers of the vertex angles A3 may be different. For instance, the radii of curvature of the chamfers of the vertex angles A3 may gradually increase from the outermost gradient region of the first surface S1 to the middle non-gradient region. Heights of the light guide microstructures M may gradually increase selectively from the outermost gradient region of the first surface S1 to the middle non-gradient region. In this way, the display image may not be easily subjected to display distortion as affected by angle changes.

TABLE ONE

| light guide microstructures M from left to right in horizontal direction | angle (degree) of base angle A2 | angle (degree) of base angle A1 |
|---|---|---|
| 1 | 75 | 5 |
| 2 | 70 | 10 |
| 3 | 65 | 15 |
| 4 | 60 | 20 |
| 5 | 55 | 25 |
| 6 | 50 | 30 |
| 7 | 45 | 35 |
| 8 | 40 | 40 |
| 9 | 35 | 45 |
| 10 | 30 | 50 |
| 11 | 25 | 55 |
| 12 | 20 | 60 |
| 13 | 15 | 65 |
| 14 | 10 | 70 |
| 15 | 5 | 75 |

Figure 9A:
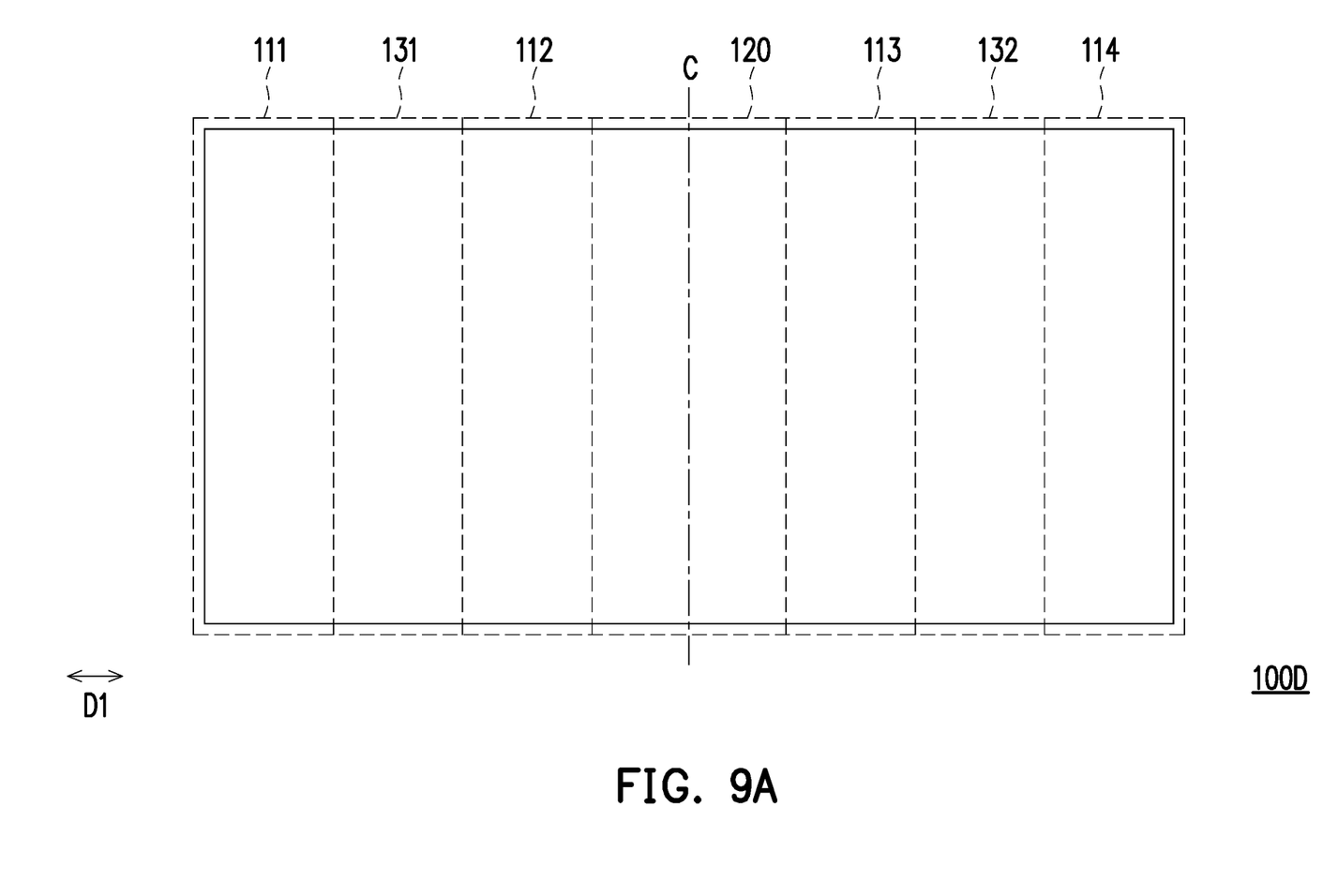
FIG. 9A and FIG. 9B respectively are a top schematic view and a cross-sectional schematic view of a light guide device according to another embodiment of the disclosure.
Figure 9B:
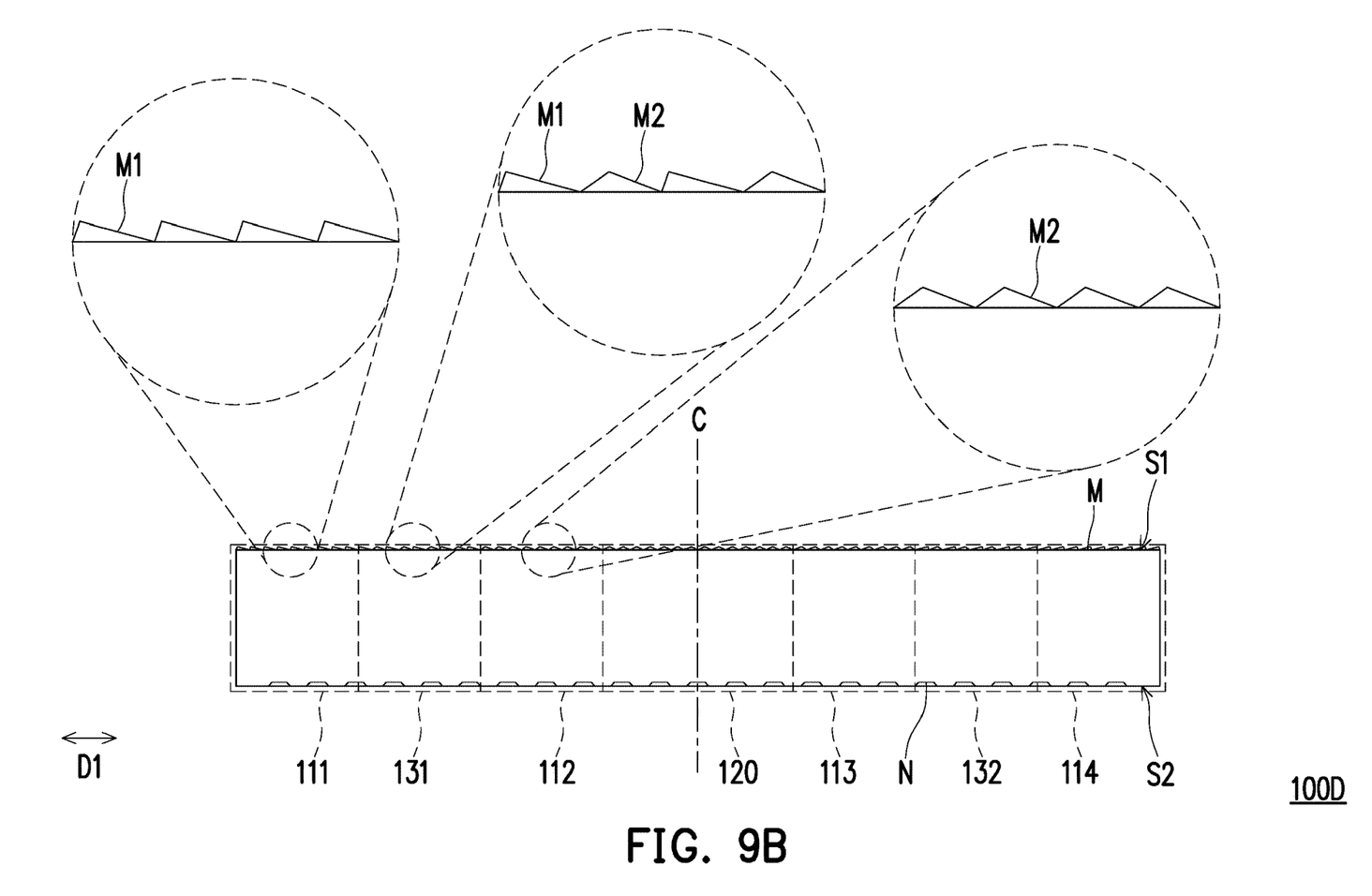

FIG. 9A and FIG. 9B respectively are a top schematic view and a cross-sectional schematic view of a light guide device according to another embodiment of the disclosure. With reference to FIG. 9A and FIG. 9B, a light guide device 100D provided by this embodiment is similar to the light guide device 100C shown in FIG. 8B. A difference therebetween is that the first surface S1 in this embodiment further includes a plurality of mixed regions 131 and 132. The mixed region 131 is located between the gradient region 111 and the gradient region 112, and the mixed region 132 is located between the gradient region 113 and the gradient region 114. The cross sections of at least one part of the light guide microstructures M located in the mixed regions 131 and 132 are identical to the cross sections of the light guide microstructures M disposed in one of the adjacent gradient regions. The cross sections of at least another part of the light guide microstructures M located in the mixed regions are identical to the cross sections of the light guide microstructures M disposed in another one of the adjacent gradient regions. The at least one part of the light guide microstructures M and the at least another part of the light guide microstructures M are arranged in an alternating manner.

To be specific, the light guide device 100D provided by this embodiment is located in the mixed region 131 located between the gradient region 111 and the gradient region 112 and provided with the light guide microstructures M1 identical to that in the gradient region 111 and the light guide microstructures M2 identical to that in the gradient region 112. Similarly, the mixed region 132 located between the gradient region 113 and the gradient region 114 is provided with the light guide microstructures M2 identical to that in the gradient region 113 and the light guide microstructures M1 identical to that in the gradient region 114. In this way, the horizontal viewing angle of the display apparatus using the light guide device 100D is increased, display quality of the display image to be viewed by multiple users is thereby further improved, and moreover, thanks to the arrangement of the mixed regions, junctions of the gradient regions may not be easily seen by users. In different embodiments, the number, width, and different arrangement manners of the disposed light guide microstructures of the mixed regions may be changed and designed according to needs, which should however not be construed as limitations to the disclosure.

In view of the foregoing, in the light guide device and the display apparatus provided by the disclosure, the light output surfaces of the light guide device include the light guide microstructures arranged in the horizontal viewing angle direction. The cross sections of the light guide microstructures in the horizontal viewing angle direction are non-isosceles triangles. The distribution position of the light guide microstructures is symmetrical to the central axis of the light guide device in the horizontal viewing angle direction, and the maximum base angle of the cross section of each of the light guide microstructures is away from the central axis. In this way, light emission intensity of the display apparatus at a large viewing angle may be improved, the horizontal viewing angle of the display apparatus may be further increased, such that multiple users may view a display image at the same time, and a favorable viewing effect is also provided.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light guide device, adapted to a backlight module comprising a light-emitting device disposed at one side of a light incident surface of the light guide device,
wherein the light guide device has a first surface and a second surface opposite to each other, the light incident surface is connected to the first surface and the second surface, the first surface comprises a plurality of light guide microstructures arranged in a first direction, an extending direction of each of the plurality of the light guide microstructures is perpendicular to the light incident surface, and cross sections of at least one part of the light guide microstructures in the first direction are non-isosceles triangles, wherein a distribution position of the light guide microstructures whose cross sections are non-isosceles triangles are symmetrical to a central axis of the light guide device in the first direction, the cross section of each of the light guide microstructures has a first base angle and a second base angle, the second base angle is greater than the first base angle, and the second base angle of the cross section of the each of the light guide microstructures is away from the central axis,
wherein the first surface further comprises a plurality of gradient regions arranged in the first direction, and the light guide microstructures are disposed in the gradient regions, wherein angles of the second base angles of the cross sections of the light guide microstructures in each of the gradient regions are identical, and the angles of the second base angles of the cross sections of the light guide microstructures M increase when a distance between each of the gradient regions and the central axis increases.

2. The light guide device according to claim 1, wherein all cross sections of the light guide microstructures are non-isosceles triangles, and angles of the maximum second base angles of the cross sections of the light guide microstructures are identical.

3. The light guide device according to claim 1, wherein the first surface further comprises a non-gradient region located between the gradient regions, and the cross sections of the light guide microstructures located in the non-gradient region are isosceles triangles, and the central axis of the light guide device is located in the non-gradient region.

4. The light guide device according to claim 1, wherein the first surface further comprises a plurality of mixed regions located between the gradient regions, the cross sections of at least one part of the light guide microstructures located in the mixed regions are identical to the cross sections of the light guide microstructures disposed in one of the adjacent gradient regions, the cross sections of at least another part of the light guide microstructures located in the mixed regions are identical to the cross sections of the light guide microstructures disposed in another one of the adjacent gradient regions, and the at least one part of the light guide microstructures and the at least another part of the light guide microstructures are arranged in an alternating manner.

5. The light guide device according to claim 1, wherein first base angles of the cross sections of the light guide microstructures are less than 10 degrees, and vertex angles of the cross sections of the light guide microstructures are between 80 degrees and 120 degrees.

6. The light guide device according to claim 1, wherein vertex angles of the cross sections of the light guide microstructures has radius of curvatures.

7. The light guide device according to claim 1, wherein the second surface further comprises a plurality of bottom side light guide microstructures, and the bottom side light guide microstructures extend in the first direction.

8. A display apparatus, comprising a backlight module and a display module, wherein:
the backlight module is configured to provide an illumination beam, the backlight module comprises a light-emitting device and a light guide device, the light-emitting device is disposed at one side of a light incident surface of the light guide device, the light-emitting device provides a light beam towards the light guide device, the light guide device receives the light beam to form the illumination beam, the light guide device has a first surface and a second surface opposite to each other, the light incident surface is connected to the first surface and the second surface, the first surface comprises a plurality of light guide microstructures arranged in a first direction, and cross sections of at least one part of the light guide microstructures in the first direction are non-isosceles triangles, and an extending direction of each of the plurality of the light guide microstructures is perpendicular to the light incident surface, wherein a distribution position of the light guide microstructures whose cross sections are non-isosceles triangles are symmetrical to a central axis of the light guide device in the first direction, the cross section of each of the light guide microstructures has a first base angle and a second base angle, the second base angle is greater than the first base angle, and the second base angle of the cross section of the each of the light guide microstructures is away from the central axis, wherein the first surface further comprises a plurality of gradient regions arranged in the first direction, and the light guide microstructures are disposed in the gradient regions, wherein angles of the second base angles of the cross sections of the light guide microstructures in each of the gradient regions are identical, and the angles of the second base angles of the cross sections of the light guide microstructures M increase when a distance between each of the gradient regions and the central axis increases, and
the display module is disposed in a transmission path of the illumination beam and is configured to receive the illumination beam to form a display image.

9. The display apparatus according to claim 8, wherein the first direction is parallel to the light incident surface.

* * * * *